(12) United States Patent
Prakash et al.

(10) Patent No.: US 7,492,974 B2
(45) Date of Patent: Feb. 17, 2009

(54) GRAY SCALE IMAGE CLEANING SYSTEM AND METHOD

(75) Inventors: Ravinder Prakash, Concord, NC (US); Robert W. Kruppa, Bluffton, SC (US); Rodney G. Moon, Charlotte, NC (US); Madhura Sathe, Charlotte, NC (US)

(73) Assignee: International Business Machines Corporation, Armonk, NY (US)

( * ) Notice: Subject to any disclaimer, the term of this patent is extended or adjusted under 35 U.S.C. 154(b) by 671 days.

(21) Appl. No.: 11/206,727

(22) Filed: Aug. 18, 2005

(65) Prior Publication Data

US 2007/0041629 A1    Feb. 22, 2007

(51) Int. Cl.
*G06K 9/00* (2006.01)

(52) U.S. Cl. .................. 382/540; 382/137; 382/139

(58) Field of Classification Search .............. 382/137, 382/139, 140, 254, 259, 270, 275; 358/450, 358/540
See application file for complete search history.

(56) References Cited

U.S. PATENT DOCUMENTS

| | | | |
|---|---|---|---|
| 3,973,239 A * | 8/1976 | Kakumoto et al. ......... 382/275 |
| 4,625,330 A | 11/1986 | Higgins | |
| 5,077,805 A * | 12/1991 | Tan ............................ 382/137 |
| 6,243,504 B1 | 6/2001 | Kruppa | |
| 6,393,161 B1 * | 5/2002 | Stevenson et al. ........... 382/275 |
| 2003/0161523 A1 | 8/2003 | Moon et al. | |
| 2004/0071333 A1 | 4/2004 | Douglas et al. | |
| 2004/0217170 A1 | 11/2004 | Takiguchi et al. | |

* cited by examiner

*Primary Examiner*—Thomas D Lee
(74) *Attorney, Agent, or Firm*—Douglas Lashmit; Hoffman Warnick LLC

(57) ABSTRACT

A gray scale image cleaning algorithm for improved check code line OCR. An image processing system for processing a gray scale image is provided that includes: a system for generating a first thresholded black white image from the gray scale image; a system for generating a second thresholded black white image from the gray scale image, wherein the second thresholded black white image is generated with a higher threshold value than the first thresholded black white image; and a system for logically combining the first and second thresholded black white images to generate a composite image.

3 Claims, 3 Drawing Sheets

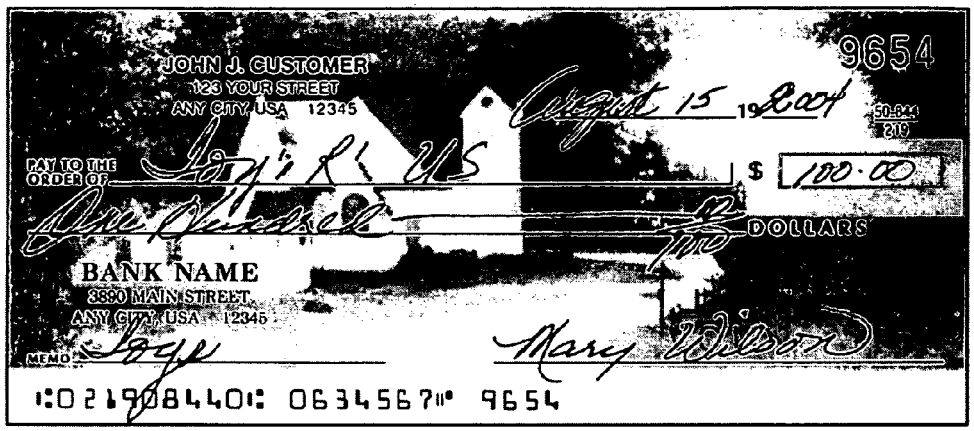
FIG. 2
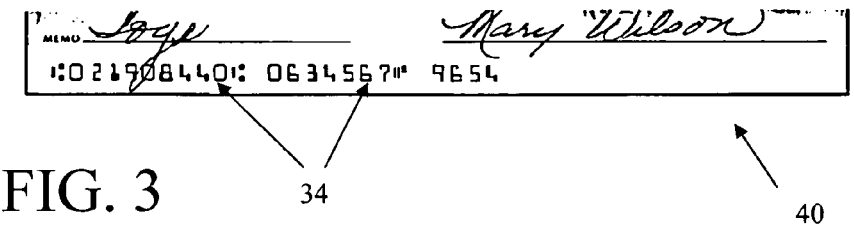
FIG. 3      34                                   40
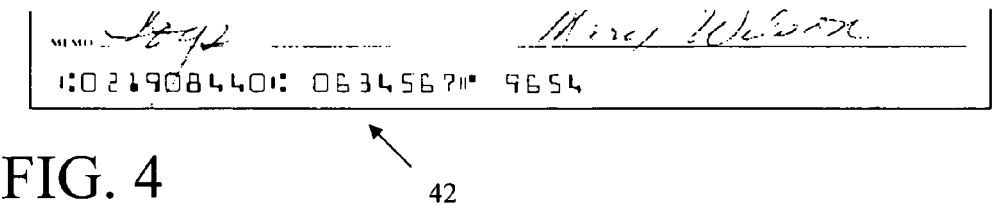
FIG. 4              42

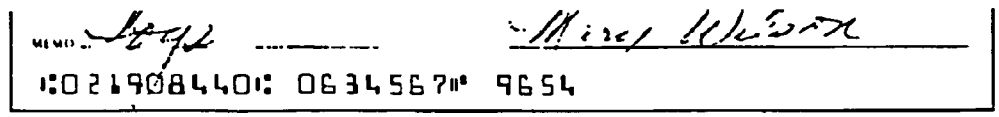
FIG. 5            44
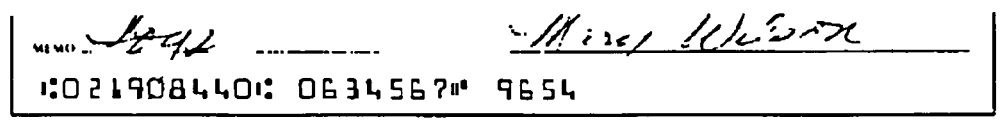
FIG. 6            46
⑊:021908440⑊:  063456 7⑊⑊  9654
FIG.7

GRAY SCALE IMAGE CLEANING SYSTEM AND METHOD

BACKGROUND OF THE INVENTION

1. Technical Field

The present invention relates generally to processing gray scale images, and more specifically relates to a gray scale image cleaning system and method for improved check code line optical character recognition (OCR).

2. Related Art

With the passage of the Check 21 Act in 2004, the bank of first deposit is now allowed to send an electronic-image, in lieu of an actual item (e.g., a paper check), for collection. In order to process the electronic image, the paying bank must be able read the code line via an optical character recognition (OCR) engine, since no magnetic ink is present to utilize a traditional magnetic ink character recognition (MICR) engine. Thus, there is accelerated interest in the ability to perform OCR on the code line of a check image.

While ANSI (American Numerical Standards Institute) specifications call for a clean code line region, the code line region is often polluted by check print background, signature descenders and other forms of video noise. While these foreign writings do not affect MICR readability, they offer serious challenges to the OCR engines. For instance, as can be seen in FIG. 2, an entry in the memo field of a sample check includes a "descender" that crosses into, and pollutes the code line. This interference may cause the OCR engine to fail or deliver erroneous "read" information, which in turn results in laborious manual operations and costs.

The cited problem becomes worse as the video contrast between useful foreground information (i.e., MICR Characters) and video noise increases. Thus, the ability to produce black white images free of video noise becomes increasingly difficult. Accordingly, a need exists for a system that can effectively clean up the pollution found in check code lines.

SUMMARY OF THE INVENTION

The present invention addresses the above-mentioned problems, as well as others, by providing a gray scale image cleaning algorithm for improved check code line OCR. In a first aspect, the invention provides an image processing system for processing a gray scale image, comprising: a system for generating a first thresholded black white image from the gray scale image; a system for generating a second thresholded black white image from the gray scale image, wherein the second thresholded black white image is generated with a higher threshold value than the first thresholded black white image; and a system for logically combining the first and second thresholded black white images to generate a composite image.

In a second aspect, the invention provides a program product stored on a computer readable medium for processing a code line in a gray scale image, comprising: program code configured for generating a normally thresholded black white image from the gray scale image; program code configured for generating a skeleton image from the gray scale image, wherein the skeleton image comprises an altered threshold setting; and program code configured for logically combining the normally thresholded black white image and the skeleton image to generate a composite image.

In a third aspect, the invention provides a method of processing a code line in a gray scale image, comprising: generating a normally thresholded black white image from the gray scale image; generating a skeleton image from the gray scale image, wherein the skeleton image comprises an altered threshold setting; and logically combining the normally thresholded black white image and the skeleton image to generate a composite image.

In a fourth aspect, the invention provides a method for deploying an image processing system, comprising: providing a computer infrastructure being operable to: generate a normally thresholded black white image from a gray scale image; generate a skeleton image from the gray scale image; and logically combine the normally thresholded black white image and the skeleton image to generate a composite image.

In a fifth aspect, the invention provides computer software embodied in a propagated signal for implementing an image processing system, the computer software comprising instructions to cause a computer to perform the following functions: generate a normally thresholded black white image from the gray scale image; generate a skeleton image from the gray scale image; and logically combine the normally thresholded black white image and the skeleton image to generate a composite image.

BRIEF DESCRIPTION OF THE DRAWINGS

These and other features of this invention will be more readily understood from the following detailed description of the various aspects of the invention taken in conjunction with the accompanying drawings in which:

FIG. 2 depicts a gray scale image of a check.

FIG. 3 depicts a normally thresholded black white image generated in accordance with an embodiment of the present invention.

FIG. 4 depicts a skeleton image generated in accordance with an embodiment of the present invention.

FIG. 5 depicts a composite image generated in accordance with an embodiment of the present invention.

FIG. 6 depicts a cleaned-up version of the composite image generated in accordance with an embodiment of the present invention.

FIG. 7 depicts a MICR code line captured from the cleaned-up version of the composite image.

DETAILED DESCRIPTION OF THE INVENTION

Figure 1:
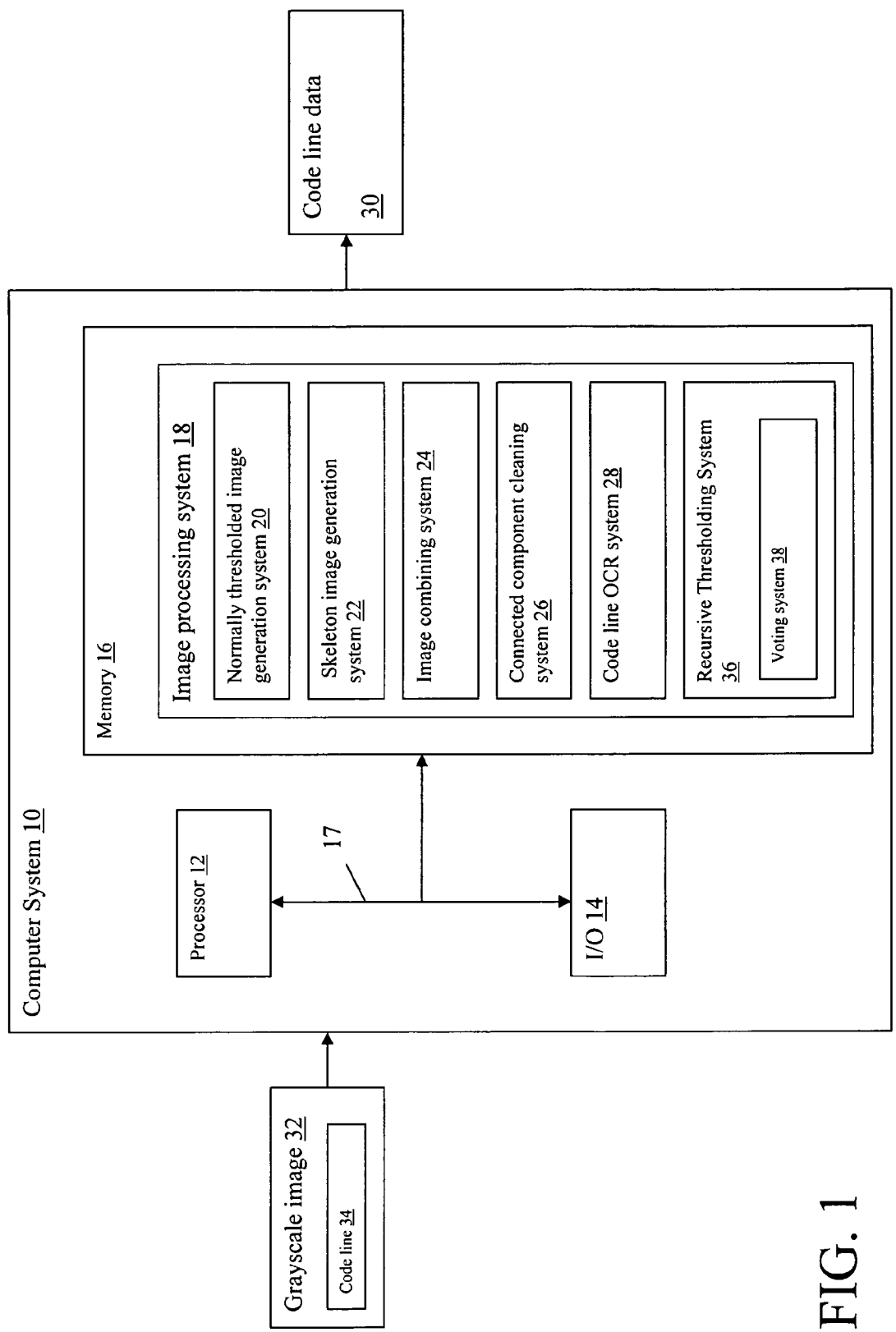
FIG. 1 depicts a computer system having an image processing system in accordance with an embodiment of the present invention.

Referring now to the figures, FIG. 1 depicts a computer system 10 having an image processing system 18 that generates code line data 30 from an inputted gray scale image 32 (e.g., a check) having a code line 34. Image processing system 18 provides gray scale image cleaning for improved check code line optical character recognition (OCR) to address the situation where the code line 34 is polluted by other information in the gray scale image 32. It should be appreciated that while the illustrative embodiments described herein relate to the cleaning of a code line 34 in a check image, the techniques described herein could be applied to the processing of any gray scale image for other purposes. Moreover, it should be appreciated that the term "black white image," as used herein, is intended to refer to any bitonal image.

In an illustrative embodiment detailed below, image processing system 18 creates a "skeleton" image using higher and adaptive thresholding. The skeleton image is then subjected to limited blooming by logically combining the image with a normally thresholded image to generate a composite image. Subsequently, the composite image is subjected to magnetic ink character recognition (MICR) printing rules (e.g., code line placement), and cleaned using connected component analysis. The end result is a relatively clean black white image, well suited for OCR.

In addition, recursive thresholding may be applied to produce a series of skeleton images, which can be combined with one or more normally thresholded images to produce multiple composite images. A voting engine 38 can then be applied to the OCR results of each of the composite images to improve OCR performance. Such voting engines are known in the art.

In general, computer system 10 may comprise, e.g., a desktop, a laptop, a workstation, etc. Moreover, computer system 10 could be implemented as part of a client and/or a server. Computer system 10 generally includes a processor 12, input/output (I/O) 14, memory 16, and bus 17. The processor 12 may comprise a single processing unit, or be distributed across one or more processing units in one or more locations, e.g., on a client and server. Memory 16 may comprise any known type of data storage and/or transmission media, including magnetic media, optical media, random access memory (RAM), read-only memory (ROM), a data cache, a data object, etc. Moreover, memory 16 may reside at a single physical location, comprising one or more types of data storage, or be distributed across a plurality of physical systems in various forms.

I/O 14 may comprise any system for exchanging information to/from an external resource. External devices/resources may comprise any known type of external device, including a monitor/display, speakers, storage, another computer system, a hand-held device, keyboard, mouse, voice recognition system, speech output system, printer, facsimile, pager, wireless device, etc. Bus 17 provides a communication link between each of the components in the computer system 10 and likewise may comprise any known type of transmission link, including electrical, optical, wireless, etc. Although not shown, additional components, such as cache memory, communication systems, system software, etc., may be incorporated into computer system 10.

Access to computer system 10 may be provided over a network such as the Internet, a local area network (LAN), a wide area network (WAN), a virtual private network (VPN), etc. Communication could occur via a direct hardwired connection (e.g., serial port), or via an addressable connection that may utilize any combination of wireline and/or wireless transmission methods. Moreover, conventional network connectivity, such as Token Ring, Ethernet, WiFi or other conventional communications standards could be used. Still yet, connectivity could be provided by conventional TCP/IP sockets-based protocol. In this instance, an Internet service provider could be used to establish interconnectivity. Further, as indicated above, communication could occur in a client-server or server-server environment.

As shown in FIG. 1, image processing system 18 includes a normally thresholded image generation system 20, a skeleton image generation system 22, an image combining system 24, a connected component cleaning system 26, a code line OCR system 28, and a recursive thresholding system 36.

In accordance with an illustrative imaging process, normally thresholded image generation system 20 generates a normally thresholded black white image from the gray scale image 32. In general, thresholding refers to the process of determining whether a gray scale pixel should be converted to black or white. The concept of a "normally" thresholded black white image is known in the art as one that provides an optimal level of intelligibility. FIG. 3 shows a portion of a normally thresholded black white image 40 take from the check image shown in FIG. 2. As can be seen, the code line 34 is polluted by a "descender," namely, a lower case letter.

In a similar manner, as shown in FIG. 4, a black white skeleton image 42 is generated by skeleton image generation system 22 from the gray scale image 32. The skeleton image 42 is adaptively thresholded with a higher thresholding value than that used for the normally thresholded black white image 40. (Adaptive thresholding, which is known in the art, automatically adjusts the thresholding value based on values obtained from the local background.) Accordingly, the lines in the skeleton image 42 appear faded, as the threshold for determining whether each gray scale pixel should be black or white is biased towards white. In the example shown, the skeleton image 42 was produced with a fixed threshold of 31 DN (digital number), i.e., all pixels having a video value of 31 or below were set to black. Processes for generating normally thresholded and skeleton images are well know in the art, and are therefore not discussed in further detail.

Next, as shown in FIG. 5, image combining system 24 generates a composite image 44 by logically combining the normally thresholded black white image 40 with the black white skeleton image 42. An illustrative process for implementing image combining system 24 includes the steps of:

(1) identifying each pixel location in the skeleton image 42 that comprises a black pixel;

(2) for each pixel location identified in the skeleton image 42, examining an associated pixel location in the normally thresholded black white image 40 to identify each neighbor of the associated pixel location; and (3) generating the composite image 44 to include each identified black pixel from the skeleton image 42 and any black neighboring pixels identified from the normally thresholded black white image 40.

As can be seen in FIG. 5, the code line of composite image 44 has much less pollution than the normally thresholded black white image 40. Note that in this illustrative embodiment, the skeleton image 40 is only allowed to grow by one pixel in all directions (i.e., limited blooming). This has been chosen since MICR character stroke widths are known to be 3-4 pixels at 200 dpi. However, it is appreciated that other techniques for logically combining the two images may be utilized. For instance, in other applications, the image combining system 24 could allow the black pixels in the skeleton image to grow by 2 or more pixels in some or all directions. Also note that in this embodiment, the term neighboring pixels refer to any contiguous pixel, including diagonal pixels. However, neighboring pixels need not comprise diagonal pixels.

Next, a further cleaning process, such as connected component cleaning system 26 may be applied to the composite image 44. Connected component cleaning system 26 identifies connected components having fewer than N black pixels, where N is an integer, and cleans them away (i.e., converts them to white pixels). Obviously, other known pre/post cleaning operations could likewise be utilized. Note that while this further processing step is not required, it does enhance the cleaning of the image. FIG. 6 depicts a final composite image 46 after applying connected component cleaning system 26.

Finally, code line OCR system 28 applies the rules for MICR printing to the final composite image 46, which identifies and captures the code line from the image, as shown in FIG. 7. As shown, all of the code line characters are in machine readable form, ready for OCR processing by the code line OCR system 28 to capture and generate the code line data 30.

In addition to that described above, a recursive thresholding system 36 may be provided to recursively change the thresholding parameters for the skeleton image 42 and the normally thresholded black white image 40. In this manner, multiple composite images may be generated and subjected to OCR processing in order to generate multiple sets of code line data. A voting system 38 may then be applied to the multiple sets of code line data 30 to increase the accuracy of the image processing system 18.

It should be appreciated that the teachings of the present invention could be offered as a business method on a subscription or fee basis. For example, a computer system 10 comprising image processing system 18 could be created, maintained and/or deployed by a service provider that offers the functions described herein for customers. That is, a service provider could offer to provide gray scale image cleaning as described above.

It is understood that the systems, functions, mechanisms, methods, engines and modules described herein can be implemented in hardware, software, or a combination of hardware and software. They may be implemented by any type of computer system or other apparatus adapted for carrying out the methods described herein. A typical combination of hardware and software could be a general-purpose computer system with a computer program that, when loaded and executed, controls the computer system such that it carries out the methods described herein. Alternatively, a specific use computer, containing specialized hardware for carrying out one or more of the functional tasks of the invention could be utilized. In a further embodiment, part of all of the invention could be implemented in a distributed manner, e.g., over a network such as the Internet.

The present invention can also be embedded in a computer program product, which comprises all the features enabling the implementation of the methods and functions described herein, and which—when loaded in a computer system—is able to carry out these methods and functions. Terms such as computer program, software program, program, program product, software, etc., in the present context mean any expression, in any language, code or notation, of a set of instructions intended to cause a system having an information processing capability to perform a particular function either directly or after either or both of the following: (a) conversion to another language, code or notation; and/or (b) reproduction in a different material form.

The foregoing description of the invention has been presented for purposes of illustration and description. It is not intended to be exhaustive or to limit the invention to the precise form disclosed, and obviously, many modifications and variations are possible. Such modifications and variations that may be apparent to a person skilled in the art are intended to be included within the scope of this invention as defined by the accompanying claims.

The invention claimed is:

1. A method of processing a code line in a gray scale image, comprising:
    generating a normally thresholded black white image from the gray scale image;
    generating a skeleton image from the gray scale image, wherein the skeleton image comprises an altered threshold setting;
    logically combining the normally thresholded black white image and the skeleton image to generate a composite image;
    generating a set of composite images by altering a threshold value associated with at least one of the normally thresholded black white image and the skeleton image;
    eliminating connected components in each composite image having fewer than N black pixels, where N is a predetermined integer;
    applying a set of magnetic ink character recognition (MICR) rules to identify and capture a code line from each composite image; and
    performing an OCR process on each code line to generate a set of code line data.

2. The method of claim 1, wherein the step of logically combining the normally thresholded black white image and the skeleton image comprises:
    identifying each pixel location in the skeleton image that comprises a black pixel;
    for each pixel location identified in the skeleton image, examining an associated pixel location in the normally thresholded black white image to identify each neighbor of the associated pixel location; and
    generating the composite image to include each identified black pixel from the skeleton image and any black neighboring pixels identified from the normally thresholded black white image.

3. The method of claim 1, further comprising the step of examining multiple sets of code line data.

* * * * *